(12) United States Patent
Kafka et al.

(10) Patent No.: US 11,879,382 B2
(45) Date of Patent: Jan. 23, 2024

(54) EXPLOSION RELIEF VALVE WITH ANNULAR FLAME ARRESTOR

(71) Applicant: Penn-Troy Manufacturing Inc., Troy, PA (US)

(72) Inventors: Michael Kafka, Troy, PA (US); Merle Eiffert, Troy, PA (US)

(73) Assignee: Penn-Troy Manufacturing Inc., Troy, PA (US)

( * ) Notice: Subject to any disclaimer, the term of this patent is extended or adjusted under 35 U.S.C. 154(b) by 0 days.

(21) Appl. No.: 17/950,678

(22) Filed: Sep. 22, 2022

(65) Prior Publication Data

US 2023/0018625 A1     Jan. 19, 2023

Related U.S. Application Data

(63) Continuation of application No. 16/770,430, filed as application No. PCT/US2018/067184 on Dec. 21, 2018, now Pat. No. 11,466,616, which is a continuation of application No. 15/832,343, filed on Dec. 5, 2017, now Pat. No. 10,151,239.

(51) Int. Cl.
| | |
|---|---|
| *F02B 77/10* | (2006.01) |
| *F02M 35/10* | (2006.01) |
| *F01M 13/04* | (2006.01) |
| *F16K 17/04* | (2006.01) |

(52) U.S. Cl.
CPC ......... *F02B 77/10* (2013.01); *F01M 13/0405* (2013.01); *F16K 17/0413* (2013.01); *F02M 35/10262* (2013.01)

(58) Field of Classification Search
CPC .............. F02B 77/10; F02M 35/10262; F01M 13/0405; F16K 17/0413
See application file for complete search history.

(56) References Cited

U.S. PATENT DOCUMENTS

| | | | | |
|---|---|---|---|---|
| 3,016,913 | A * | 1/1962 | Bargmann | F02B 77/10 220/88.1 |
| 3,182,647 | A * | 5/1965 | Bintz | F01M 13/0011 123/574 |
| 3,356,084 | A * | 12/1967 | Parsons | F02B 77/10 123/146.5 R |
| 3,661,295 | A * | 5/1972 | Grunwald | F16K 17/0413 220/88.2 |

(Continued)

FOREIGN PATENT DOCUMENTS

GB         2342980 A  *  4/2000  ............... A62C 4/00

*Primary Examiner* — Grant Moubry
(74) *Attorney, Agent, or Firm* — Design IP

(57) ABSTRACT

An explosion relief valve for a crankcase of an engine includes a carrier plate, a cap, and an annular flame arrestor. The carrier plate includes a valve plate that has a sinuous shape for redirecting flame back into the engine. The flame arrestor includes a plurality of layers of smooth metal sheets, with each layer having a pattern of apertures that is different in size and spacing than the pattern of apertures of its adjacent layer. The apertures of each layer are partially, and only partially, aligned with the perforations of its adjacent layers. The layers are laid flush against each other to minimize or eliminate air space between the layers, leaving only the air channels existing between the apertures of the metal sheet layers as passageways for exhaust gases to be released from the valve.

20 Claims, 10 Drawing Sheets

(56) References Cited

U.S. PATENT DOCUMENTS 6,488,048 B2 * 12/2002 Kuhmayer .......... F16K 17/0413
137/550
2014/0264136 A1 * 9/2014 Kafka .................... A62C 4/00
169/48

* cited by examiner

EXPLOSION RELIEF VALVE WITH ANNULAR FLAME ARRESTOR

BACKGROUND

A combustible gas or vapor mixture can potentially be present in the confined space of an engine crankcase. Should there be any hotspots in the crank case, at a temperature close to auto ignition of the gas or vapor mixture, an explosion could occur. The crankcase explosion relief valve is a safety device which mitigates the effects of this type of event. The explosion relief valve will open quickly to vent the rapid pressure rise caused by the explosion, and will also prohibit the propagation of any flame to the exterior of the engine's crankcase.

The origin for the development of crankcase explosion relief valves stems from an incident that occurred on the ship "Reina Del Pacifico" on Sep. 11, 1947. An oil mist, which developed within the crankcase of one of the ship's engines, was auto ignited by a hot spot that had generated on one of the internal components of the engine. This resulted in an explosion which claimed the lives of 28 people aboard the "Reina Del Pacifico". As a result of this incident, and many other similar happenings, a research group known as the British Internal Combustion Engine Relief Association (BICERA) was formed for the purpose of evaluating the causes of such occurrences, and to develop devices and practices for limiting the effects of engine crankcase explosions.

The typical look of an explosion relief valve is a cylindrical device mounted to a crankcase or engine manifold, with the device including a valve plate that releasably covers the opening of the crankcase and a flame arrestor for stifling flames erupting from the crankcase. Occasionally, these devices will be fitted with a directional cover that surrounds the exterior of the valve. The key operations of an explosion relief valve are flame suppression, swift pressure relief, and rapid resealing in the event of an explosion.

Explosion relief valves differ in the flame suppression or arresting method used. Often, the design of the flame arrestor determines the entire form, fit, and pricing of the valve. In the past manufacturers have used oil wetted mesh. In this method, the mesh screen of the valve penetrates inside the crankcase so that it may be wetted with oil during normal operation of the engine. The flame front of the explosion is forced to weave through the narrow gaps of the mesh while being quenched by the oil that is saturated in the mesh screen layers. Other manufacturers use corrugated metal surrounding the outside of the valve plate. When the valve disc opens, the flame front is forced through a series of corrugated metal strips which arrest any flames.

A modern valve developed by Penn Troy Machine Company, Inc. is disclosed in U.S. patent application Ser. No. 13/837,178, filed on Mar. 15, 2013, the disclosure of which is incorporated by reference herein in its entirety. This valve includes a flame arrestor with a single perforated metal screen and a porous metal ribbon with a sinuous shape that is positioned between the metal screen and the center axis of the valve. Similar to the corrugated metal valves discussed above, this valve arrest flames by forcing the flame front caused by an explosion to travel through the perforations of both the porous ribbon and the metal screen, effectively choking out flame propagation while still allowing exhaust gas to be released.

Many current explosion relief valves on the market include a cup shaped valve plate, wherein the flow from the valve inlet is directed at the concave portion of this cup shape. This shape can result in trapping the flow of exhaust gas erupting from the crankcase in the cup shaped region, causing the plate to act as if it were flat, whereby the flow from the inlet largely continues in its direction towards the cap of the valve. This causes the flow of gases exiting the valve to be biased in a direction away from the engine, which is unsafe due to the potential for such gases to reach heat-sensitive or flammable objects. To contain such gases from erupting away from the engine, an external directional cover is often used to redirect the flow of hot exhaust gases to a safer direction during venting.

SUMMARY

In view of the foregoing background, an improved explosion relief valve for a crankcase is provided. The valve comprises a carrier plate including an outer perimeter, a radius, a lower surface, an upper surface opposite the lower surface, and a valve inlet defined by an opening extending through carrier plate from the lower surface to the upper surface. The lower surface of the carrier plate is sized and shaped for attachment to a crankcase, and the valve inlet has a radius that is smaller than the radius of the carrier plate. The valve also includes a cap having an outer perimeter, a lower surface, and an upper surface opposite the lower surface; a valve seal positioned against the upper surface of the carrier plate and around the valve inlet of the carrier plate; a valve plate having an annular perimeter, a lower surface, and an upper surface opposite the lower surface; and an annular flame arrestor extending from the upper surface of the carrier plate to the lower surface of the cap.

The annular flame arrestor is coaxially aligned with the carrier plate and comprises a plurality of metal sheets that are arranged in a layered relationship, each of the plurality of metal sheets having first and second surfaces that are substantially planar such that when the plurality of perforated metal sheets are arranged in layers, the first surface of one metal sheet layer is flush against the second surface of an adjacent metal sheet layer. The first metal sheet includes a first pattern of apertures, and the second metal sheet includes a second pattern of apertures, with size of the apertures differing between the first and second patterns. The differing sizes and spacing of apertures between the metal sheets ensures that the apertures of each sheet are only partially aligned with the apertures of its adjacent sheet.

The valve plate has a sinuous shape that includes a central trough, an outer trench portion, and a medial crest portion located between the outer trench portion and the central trough, the medial crest portion being positioned higher than the central trough and the outer trench portion. The lower surface of the valve plate is positioned against the valve seal such that the valve plate covers the valve inlet. The valve plate is biased against the valve seal by a compressed spring.

BRIEF DESCRIPTION OF THE DRAWINGS

For a more complete understanding of the present invention, reference is made to the following detailed description of an embodiment considered in conjunction with the accompanying drawings, in which.

DETAILED DESCRIPTION OF THE INVENTION

Figure 1:
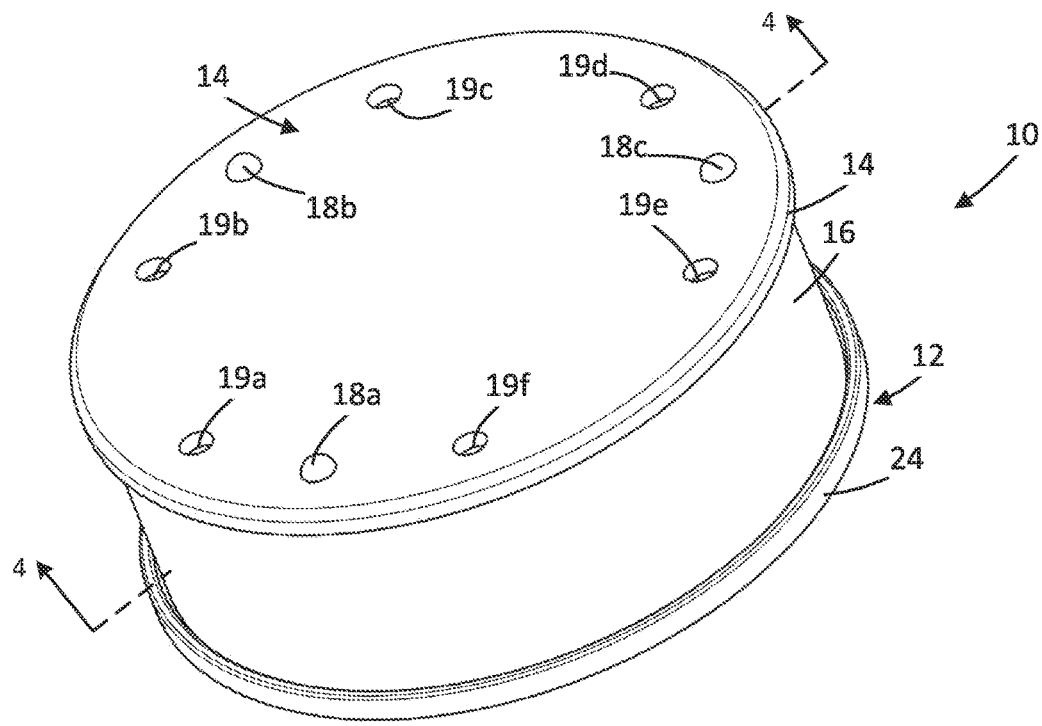
FIG. 1 is a top perspective view of an explosion relief valve assembly constructed in accordance with an embodiment of the present invention.

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning. Further, it should be noted that, as recited in the specification and in the claims appended hereto, the singular forms "a," "an," and "the" include the plural referents unless otherwise stated. Additionally, the terms "comprises" and "comprising" when used herein specify that certain features are present in that embodiment, but should not be interpreted to preclude the presence or addition of additional features, components, operations, and/or groups thereof.

The following disclosure is intended to be read in connection with the accompanying drawings, which are to be considered part of the entire written description of the invention. The drawing figures are not necessarily to scale and certain features of the invention may be shown exaggerated in scale or in somewhat schematic form in the interest of clarity and conciseness. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Figure 2:
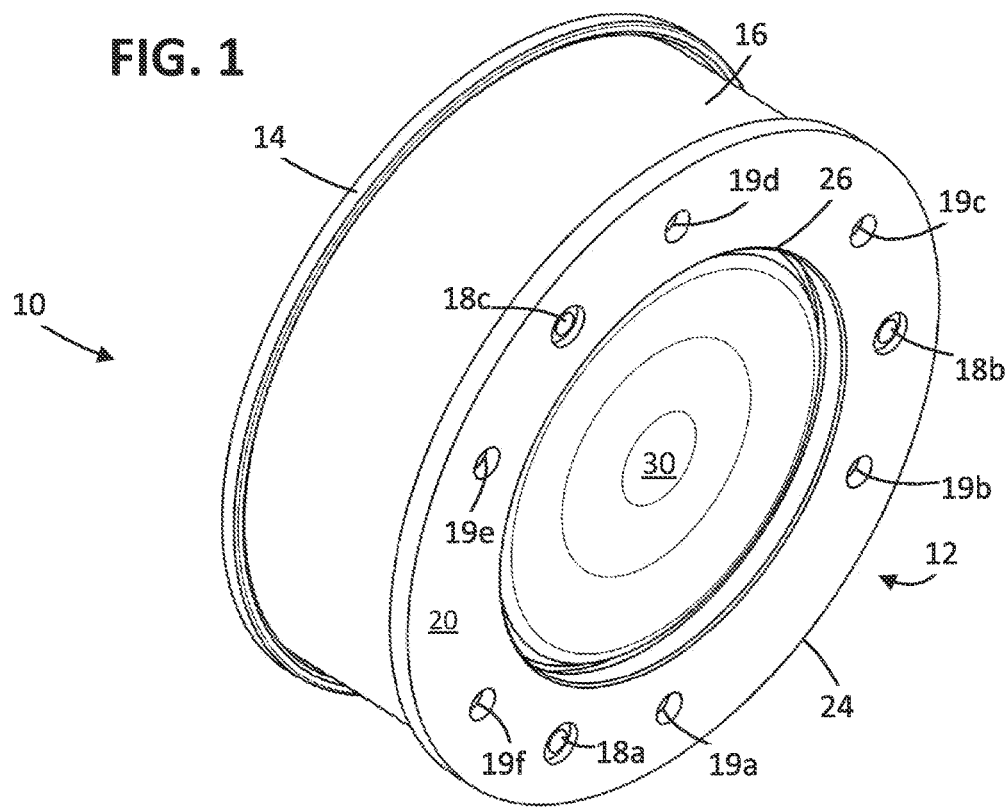
FIG. 2 is a bottom perspective view of the embodiment shown in FIG. 1.

FIGS. 1 and 2 illustrate an explosion relief valve 10 constructed in accordance with present principles. The explosion relief valve 10 includes a carrier plate 12, a cap 14, and an annular flame arrestor 16 extending between the carrier plate 12 and the cap 14. The carrier plate 12 and cap 14 are preferably circular in shape and have outer circumferences that are approximately the same size to allow the annular flame arrestor 16 to fit between the carrier plate 12 and cap 14. The assembly of the carrier plate 12, cap 14, and flame arrestor 16 are held together by rivets 18a-c, and the carrier plate 12 is held in a spaced relationship from the cap 14 by both the flame arrestor 16 and a plurality of spacers 19a-f. The carrier plate 12 and cap 14 serve as the bottom and top of the explosion relief valve 10 while the flame arrestor 16 serves as its outer walls.

Figure 3:
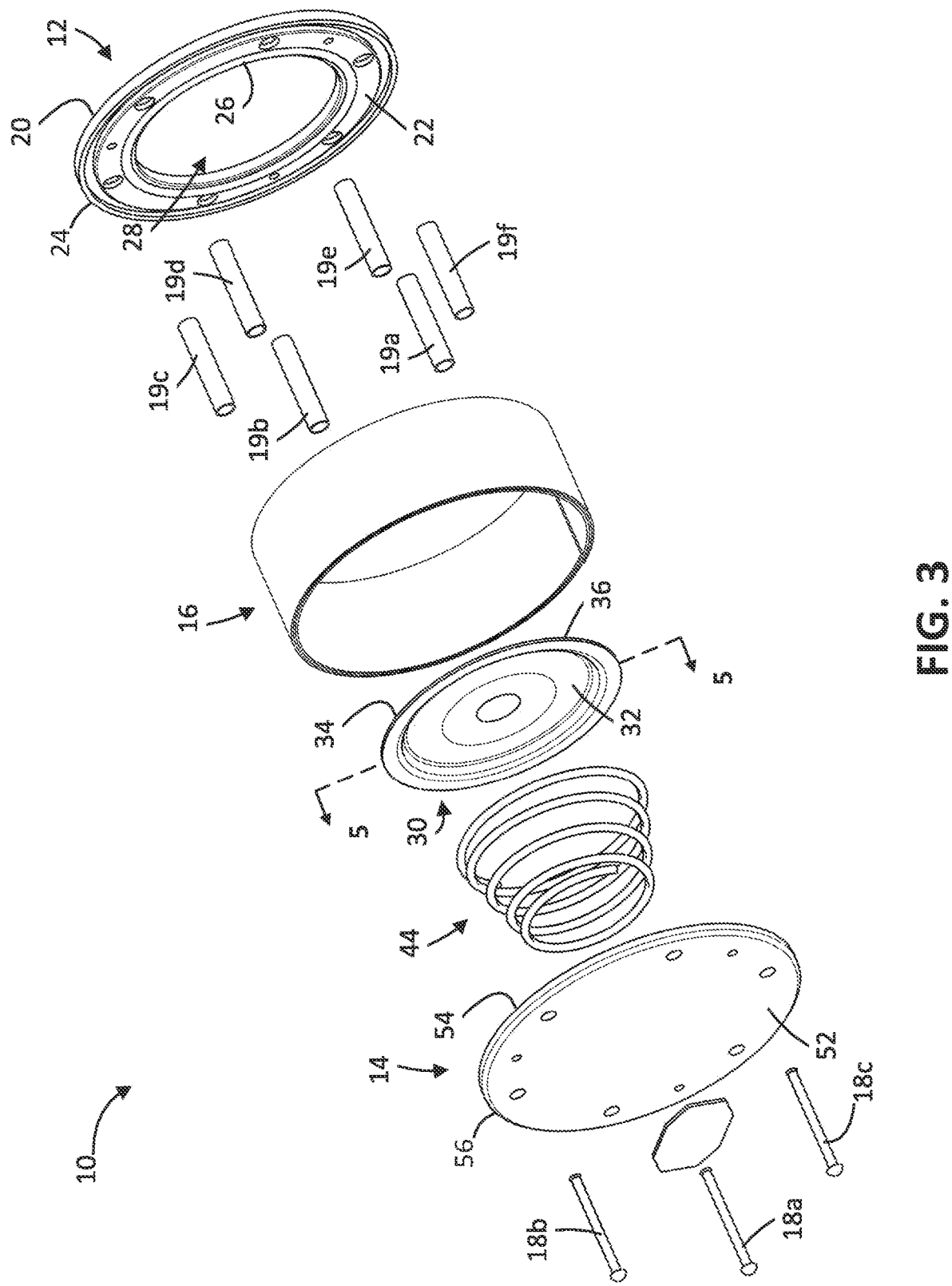
FIG. 3 is an exploded view of the embodiment shown in FIG. 1.
Figure 4:
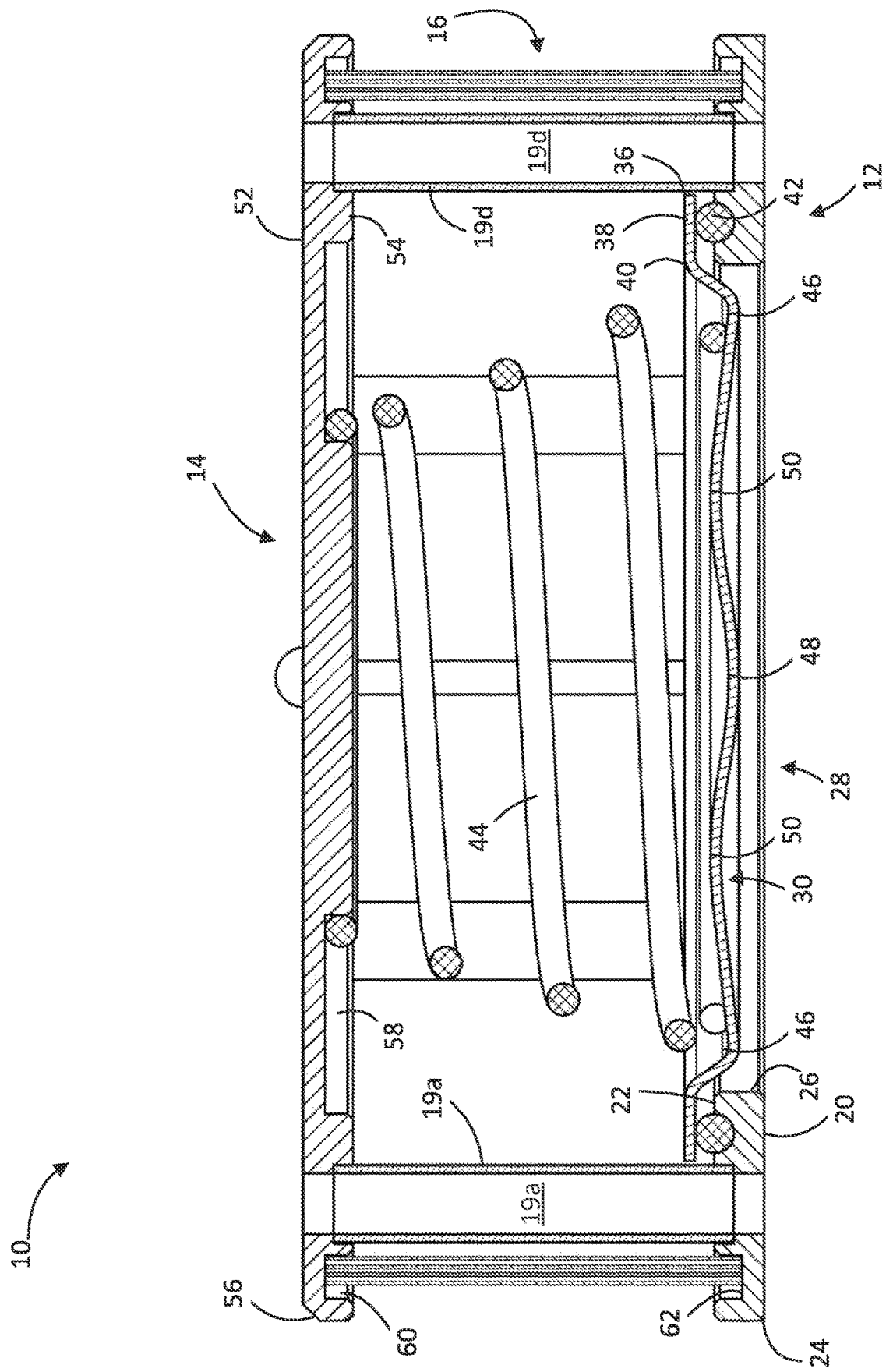
FIG. 4 is a cross-sectional view of the embodiment shown in FIG. 1 taken along the line 4-4.
Figure 10:
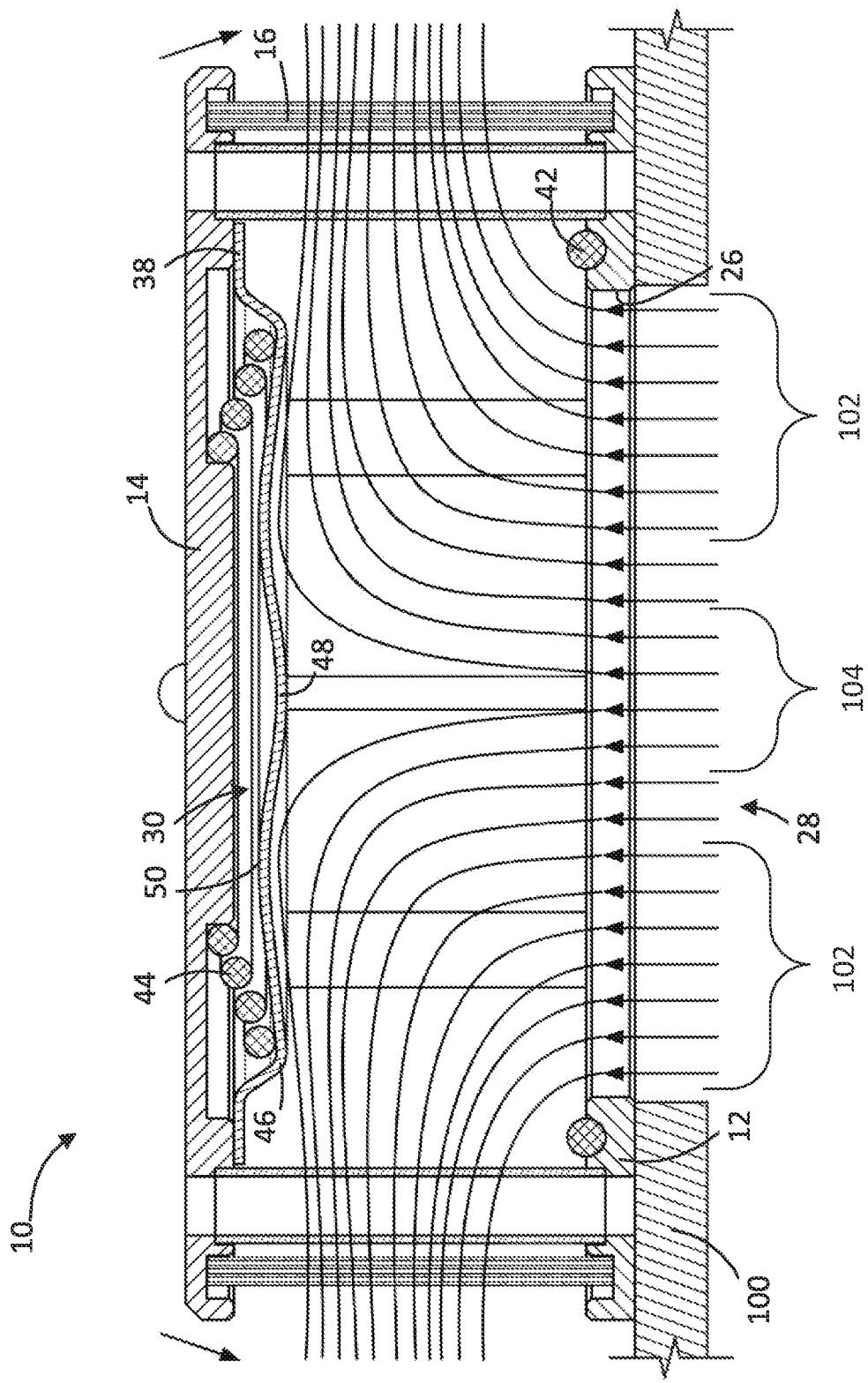
FIG. 10 is a schematic diagram of the cross-sectional view of FIG. 4 showing the explosion relief valve attached to a crankcase during an explosion.

Turning now to FIGS. 3 and 4, the carrier plate 12 is sized and shaped to attach to the crankcase of an engine (see FIG. 10, ref. no. 100). As such, it has an annular shape that is defined by a lower surface 20, an upper surface 22, an outer circumference 24, and an inner circumference 26. The inner circumference 26 defines a valve inlet 28 over which a valve plate 30 is positioned, covering the valve inlet 28. The valve plate 30 is coaxially aligned with the carrier plate 12 and has a radius that is slightly larger than the radius of the valve inlet 28. The valve plate 30 also includes an upper surface 32, a lower surface 34, and an outer perimeter 36 that extends beyond the inner circumference 26 of the carrier plate 12. The valve plate also includes an outer lip 38 that extends from the outer perimeter 36 to an annular ridge 40, which corresponds with the inner circumference 26 of the carrier plate 12. An annular gasket 42 is positioned between the upper surface 22 of the carrier plate 12 and the lower surface 34 of the outer lip 38 of the valve plate 30, and a valve spring 44 is disposed between the valve plate 30 and the cap 14, with the valve spring 44 being compressed to push the valve plate 30 against the carrier plate 12 to create an air-tight seal between the carrier plate 12 and the valve plate 30. The valve spring 44 is tuned such that it will allow the valve plate 30 to quickly release from the annular gasket 42 to relieve gaseous pressure that has built up in the engine, then quickly re-engage with the annular gasket 42 to reseal the explosion relief valve 10.

Figure 5:
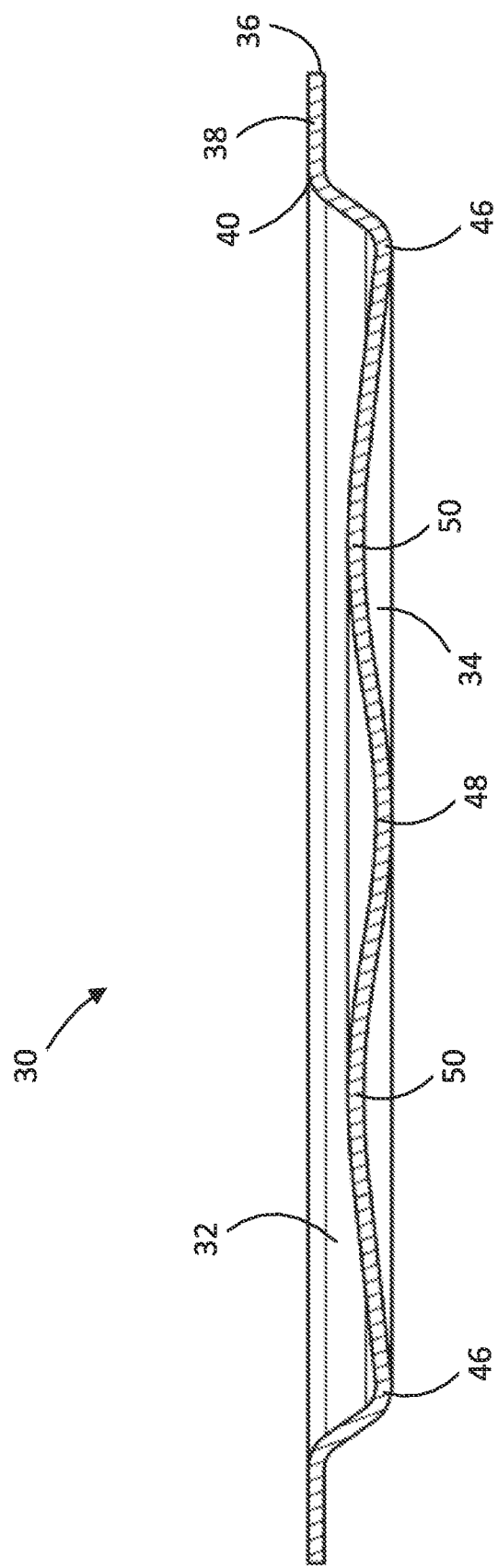
FIG. 5 is a cross-sectional view of the valve plate shown in FIG. 3 in isolation, taken along the line 5-5.
Figure 6:
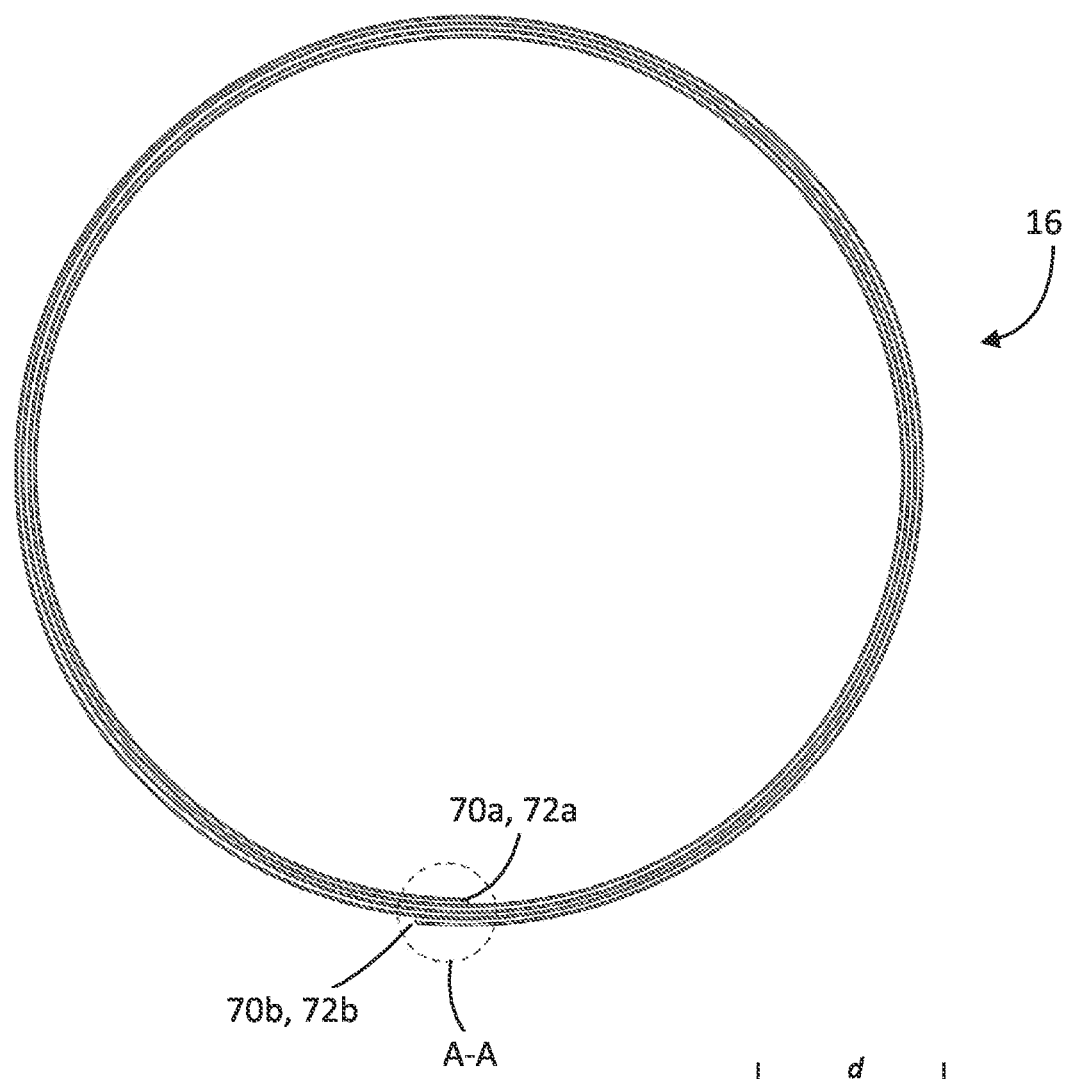
FIG. 6 is a top plan view of a flame arrestor to be used in the explosion relief valve assembly shown in FIG. 1.

With reference to FIG. 5, the valve plate 30 has a sinuous ripple shape and includes an annular outer trench 46, a central trough 48, and a medial crest 50. The outer trench 46 is concentric with and extends inwardly and downwardly from the annular ridge 40, the central trough 48 is located at the center of the valve plate 30, and the annular medial crest 50 is located between the central trough 48 and the outer trench 46. The medial crest 50 is positioned to have a higher height than the central trough 48 and the outer trench 46 do, creating the ripple shape of the valve plate 30. In one embodiment, the central trough 48 is coplanar with the outer trench 46. In another embodiment, the central trough is located below the plane of the outer trench 46. As seen in FIG. 10, when an explosion occurs inside the engine, this ripple shape of the valve plate 30 directs flame and exhaust gas erupting from the crankcase back toward the engine, causing such flame and gas to travel laterally toward and through the flame arrestor 16, which cools the exhaust gas and stifles the flame. The operation of the explosion relief valve 10 during an explosion is discussed in further detail below.

With reference to FIGS. 3 and 4, the cap 14 includes an upper surface 52, a lower surface 54, and an outer circumference 56 that corresponds to the outer circumference 24 of the carrier plate 12. The cap 14 includes an annular spring recess 58 in its lower surface 54 that accommodates the valve spring 44 and serves as the basis against which the valve spring 44 compresses. The cap 14 also includes a top annular groove 60 that accommodates the top end of the flame arrestor 16, and the carrier plate 12 likewise includes a bottom annular groove 62 in its upper surface 22 that accommodates the bottom end of the flame arrestor 16.

Turning now to FIGS. 6, 7, and 8A-B, the flame arrestor 16 is shown separated from the rest of the explosion relief valve 10. The flame arrestor 16 is constructed from a plurality of layers of metal sheets (i.e., layers 64a-i), with each metal sheet having smooth first and second surfaces 66, 68 to allow each layer to be in flush contact with its adjacent layers. More particularly, the flame arrestor 16 is constructed from two elongated metal sheets (i.e., first and second metal sheets 70, 72) that are laid against each other and wrapped multiple times in a coiled shape. Each of the first and second metal sheets 70, 72 includes a first smooth surface 66 (first smooth surfaces 66a, 66b), a second smooth surface 68 (second smooth surfaces 68a, 68b), and a thickness T defined by the distance between the first smooth surface 66 and the second smooth surface 68 (i.e., thickness $T_{70}$ for the first metal sheet 70; thickness $T_{72}$ for the second metal sheet 72).

In this application, the term "smooth surface" is intended to mean a surface that is free of protrusions, cavities, dimples, vents, or other such deviations that extend from the surface a distance greater than 0.050 inches. Preferably, a "smooth surface" is free of deviations that extend from the surface more than 0.020 inches and, more preferably, 0.003 inches. In addition, the term "flush" is intended to mean an abutting arrangement between smooth surfaces of two metal sheets such that a smooth surface of one sheet is in direct contact with a smooth surface of the second metal sheet, resulting in a spacing between the two surfaces of no greater than 0.050 inches. Preferably, a flush arrangement has a spacing of no more than 0.020 inches and, more preferably, no more than 0.003 inches.

The process of creating the flame arrestor 16 begins by laying both first and second metal sheets 70, 72 against each other such that the first surface 66a of the first metal sheet 70 is flush against the second surface 68b of the second metal sheet 72, with their ends (i.e., first ends 70a, 72a) aligned, creating the first two layers 64a, 64b. The layered first and second metal sheets 70, 72 are then wrapped in a circular direction for a full 360 degree revolution until the second surface 68a of the first metal sheet 70 is flush against the first surface 66b of the second metal sheet 72, creating a new set of layers (i.e., layers 64c and 64d) for the flame arrestor 16. This wrapping process continues for a desired number of revolutions, and with each full revolution, a new set of layers (i.e., layers 64e and 64f; layers 64g and 64h; etc.) is created by the first and second metal sheets 70, 72. Each new set of layers is positioned such that each layer is in flush contact its adjacent layers (i.e., layer 64a is in flush contact with layer 64b; layer 64b is in flush contact with 64c; etc.)

Figure 7:
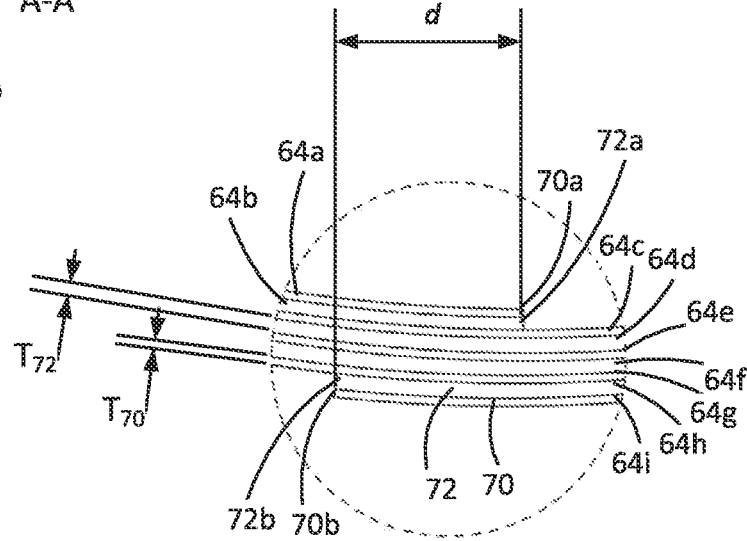
FIG. 7 is an enlarged partial view of area A-A of FIG. 6.
Figure 8A:
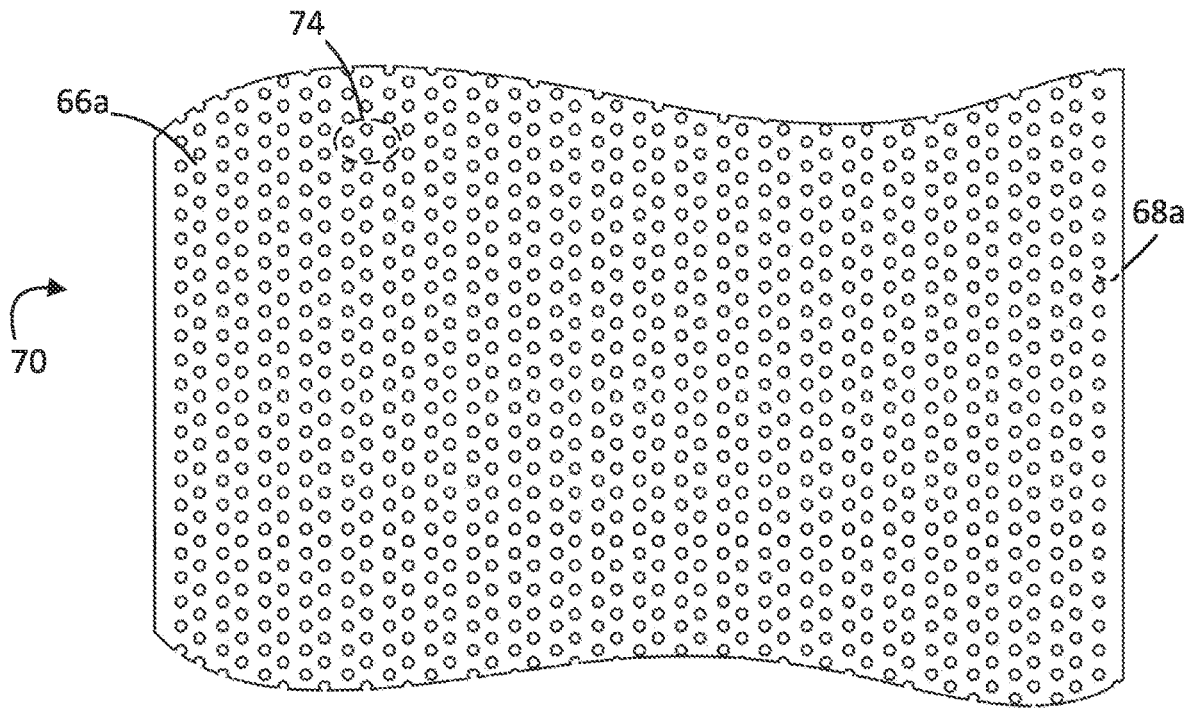
FIG. 8A is a partial view of a first metal sheet of the flame arrestor shown in FIG. 6.
Figure 8B:
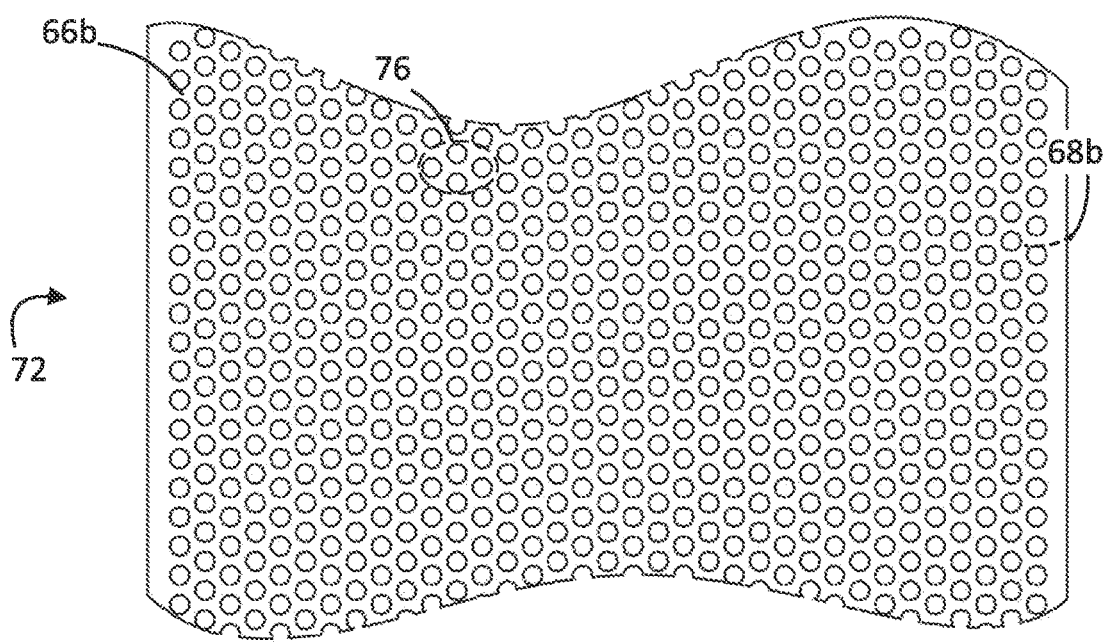
FIG. 8B is a partial view of a second metal sheet of the flame arrestor shown in FIG. 6.
Figure 9A:
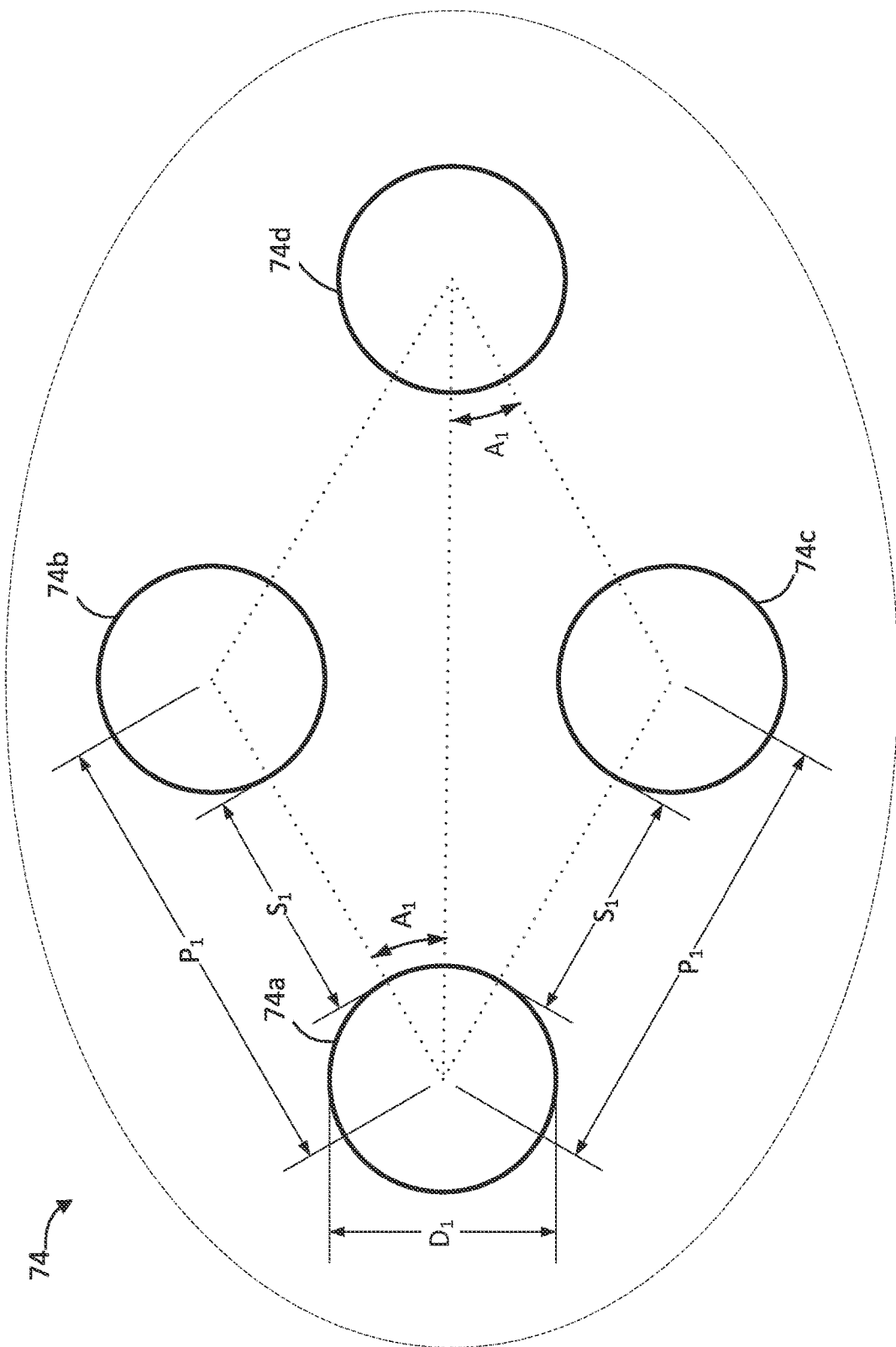
FIG. 9A is an enlarged view of the first pattern of apertures of the first metal sheet shown in FIG. 8A.
Figure 9B:
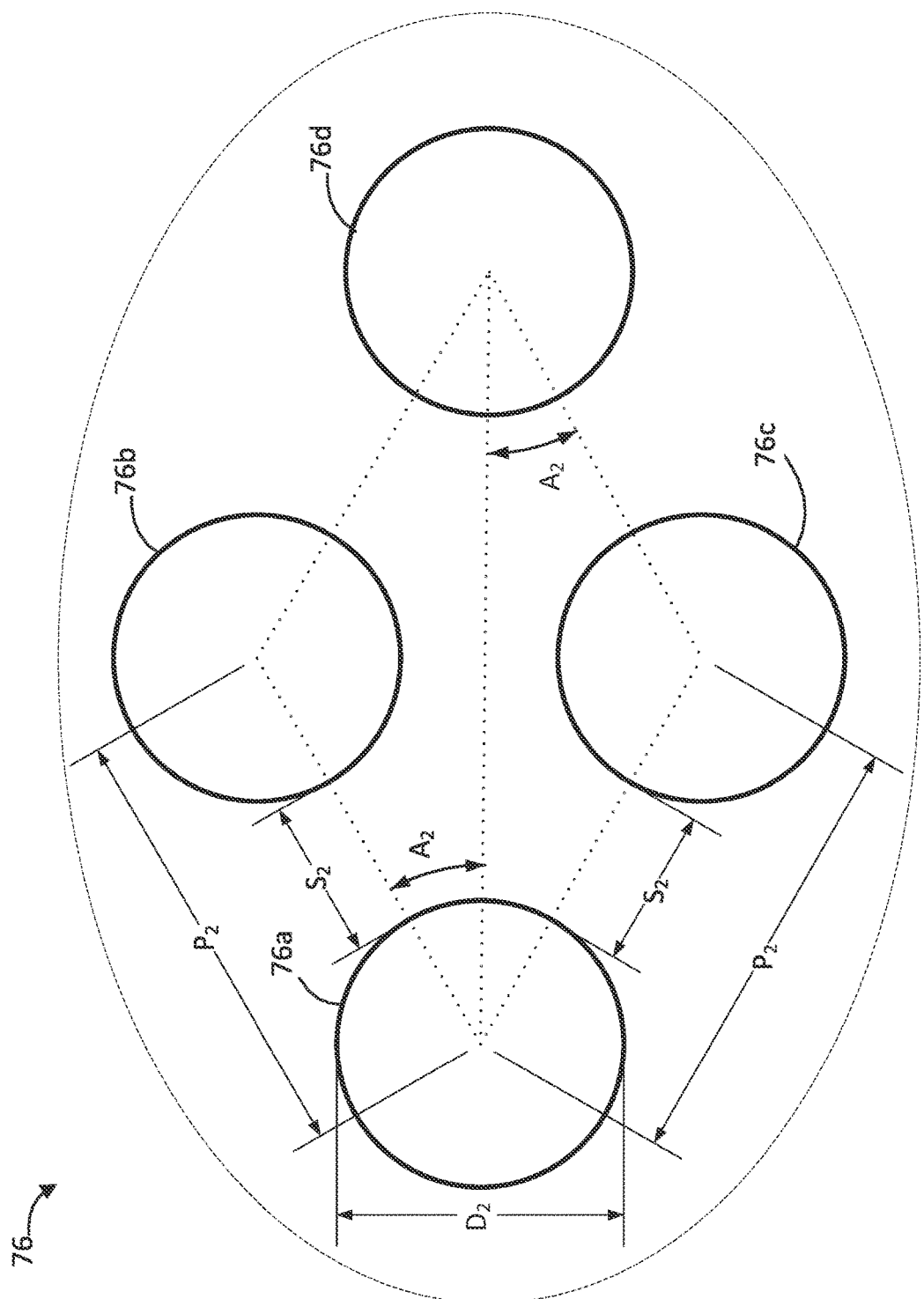
FIG. 9B is an enlarged view of the second pattern of apertures of the second metal sheet shown in FIG. 8B.

Once the desired number of layers is achieved, the first and second metal sheets 70, 72 are cut to make second ends 70b, 72b, which, as seen in FIG. 7, are located a distance d beyond the location of the first ends 70a, 72a. This is to provide a sufficient amount of material overlap from the first and second metal sheets 70, 72 to enable them to be secured together between the first ends 70a, 72a and the second ends 70b, 72b, preferably by welding, while also minimizing the overlap to limit any negative impacts on exhaust gas flow through the flame arrestor 16. In one embodiment, an odd number of layers 64a-i are achieved by allowing the outermost metal sheet (i.e., first metal sheet 70) to complete an additional revolution so that it comprises the innermost layer and the outermost layer of the flame arrestor 16 (e.g., layers 64a and 64i).

Turning now to FIGS. 8A, 8B, 9A and 9B, prior to constructing the flame arrestor 16 as described above, a first pattern of apertures 74 and a second pattern of apertures 76 are formed in the first and second metal sheets 70, 72, respectively. Such apertures can be formed in the metal sheets by one or more methods well known in the art, including drilling, punching, and stamping. In one embodiment, the apertures of the first and second patterns 74, 76 are formed by punching the apertures through the material of the first and second metal sheets 70, 72. Such punching can create exit projections on one side of the metal sheet, creating a rough surface which must be smoothed. Various methods known in the art for smoothing these rough surfaces exist, including sanding, buffing, and chemical/electrical polishing.

The first pattern of apertures 74 includes a plurality of apertures (e.g., apertures 74a, 74b, 74c, and 74d) which are staggered by an angle $A_1$ from the horizontal and spaced from center to center by a pitch $P_1$ and from circumference to circumference by a spacing $S_1$. Likewise, the second pattern of apertures 76 includes a plurality of apertures (e.g., apertures 76a, 76b, 76c, and 76d) which are staggered by an angle $A_2$ from the horizontal and spaced from center to center by a pitch $P_2$ and from circumference to circumference by a spacing $S_2$. In addition, each of the apertures 74a, 74b, 74c, and 74d of the first pattern of apertures 74 has a diameter $D_1$, and each of the apertures 76a, 76b, 76c, and 76d of the second pattern of apertures 76 has a diameter $D_2$. The spacings $S_1$ and $S_2$ represent the width of metal material between each pair of apertures in the first and second metal sheets 70, 72. In one embodiment, $D_1$ is between 0.025 and 0.050 inches and $S_1$ is between 0.030 and 0.050 inches, while $D_2$ is between 0.055 and 0.090 inches and $S_2$ is between 0.020 and 0.040 inches. The first and second patterns of apertures 74, 76 are repeated throughout the first and second metal sheets 70, 72, respectively, to ensure that the flame arrestor 16 is sufficiently permeable to allow exhaust gas released from the valve inlet 28 to escape into the outer atmosphere.

The flame arrestor 16 is constructed with two competing interests in mind: (1) allowing gas to be released from the explosion relief valve 10 and dissipate into the surrounding environment; and (2) limiting the availability of oxygen that can allow flames to propagate after an explosion. Thus, with respect to the permeability of the flame arrestor 16, a balance is struck so that gas can travel through the flame arrestor 16 to relieve pressure inside the engine, but not to the degree where rapid oxidation (i.e., fire) can easily occur. In such circumstances, the plurality of layers 64a-i of the flame arrestor 16 are constructed such that the apertures of each layer are partially, and only partially, coaxially aligned with the apertures of its adjacent layers. To ensure this arrangement, the first and second patterns of apertures 74, 76 are created such that the diameter $D_1$ of the apertures in the first pattern 74 are smaller than the diameter $D_2$ of the apertures in the second pattern 76. In addition, the spacing $S_1$ of the apertures in the first pattern 74 is configured to be larger than the spacing $S_2$ of the apertures in the second pattern 76. This allows the channels in the flame arrestor 16 through which gas can travel to be narrower than the size of the apertures in the first and second metal sheets 70, 72 without having such apertures be totally closed off from gas release. In addition, because the first and second metal sheets 70, 72 are smooth, any air gaps between the layers 64 of the flame arrestor 16 are effectively eliminated, thereby ensuring that flames do not propagate between the layers 64 of the flame arrestor 16.

In one embodiment, the first pattern of apertures 74 has a staggered angle of 30° from horizontal, a pitch of 0.074 inches, and a spacing of 0.041 inches ($A_1$=30°; $P_1$=0.074 in.; $S_1$=0.041 in.), with each aperture being 0.033 inches in diameter ($D_1$=0.033 in.), while the second pattern of apertures 76 have a staggered angle of 30° from horizontal, a pitch of 0.094 inches, and a spacing of 0.031 in. ($A_2$=30°; $P_2$=0.094 in.; $S_2$=0.031 in.), with each aperture being 0.063 inches in diameter ($D_2$=0.063 in.). In one embodiment, the first metal sheet 70 is made from 24 gauge stainless steel (i.e., $T_{70}$=0.024 inches) while the second metal sheet 72 is made from 20 gauge stainless steel (i.e., $T_{72}$=0.036 inches).

FIG. 10 illustrates the operation of the explosion relief valve 10 when attached to a crankcase 100 of an engine. When auto ignition of a gas or vapor occurs within the confined crankcase 100, the deflagration causes the gases within the confined space to violently expand, resulting in a sudden surge in pressure. The pressure swell forces the valve plate 30 to lift off the annular gasket 42 and travel toward the cap 14, allowing the flame front and expanding exhaust gases inside the crankcase 100 to be released through the valve inlet 28.

Upon exiting the crankcase 100 and entering the interior of the explosion relief valve 10, the exhaust gases proximate to the inner circumference 26 of the carrier plate 12 (i.e., outer gases 102) exit the explosion relief valve 10 by traveling through the air channels created by the perforations in the flame arrestor 16. This reduces the peak pressure experienced inside the crankcase 100, cools the outer exhaust gases 102 as they travel through the flame arrestor 16, and halts the propagation of flames to the surrounding atmosphere.

However, as seen in FIG. 10, exhaust gases proximate to the middle of the valve inlet 28 (i.e., inner exhaust gases 104) travel upward toward the center trough 48 of the valve plate 30. The shape of the center trough 48 directs the inner exhaust gases 104 toward the medial crest 50 of the valve plate 30, whose shape then redirects the inner exhaust gases 104 toward the outer trench 46 and proximate to the flame arrestor 16. Thus, the curvature of the valve plate 30 redirects the flow of the inner exhaust gases 104 back toward the crankcase 100 from inside the explosion relief valve 10 so that the inner exhaust gases 104 join the outer exhaust gases 102 and exit through the flame arrestor 16. Thus, the design of the valve plate 30 eliminates the need for an external directional flow feature or deflection feature. Once all exhaust gases have been released, the valve spring 44 forces the valve plate 30 back toward the annular gasket 42 and seals off the carrier plate 12.

In addition to redirecting the flow exhaust gases to a safe direction for venting outside of the explosion relief valve 10, the shape of the valve plate 30 encourages the flow of hot exhaust gases and flames to concentrate through the center of the flame arrestor 16. This makes the most efficient use of heat transfer by causing the flow of exhaust gases to pass through a broader portion of the flame arrestor 16. Other valve plate shapes, as described above, allow the flames and exhaust gases to concentrate in a smaller portion of the flame arrestor material close to the cap/lid of the valve, which results in inefficient heat transfer to the material of the flame arrestor. Because more of the heat from an explosion is dissipated evenly throughout the flame arrestor 16 of the present invention, more heat can be pulled from the flame arrestor 16 into the carrier plate 12 and the cap 14 where they make direct contact with the upper and lower ends of the flame arrestor 16. The result is increased heat quenching with drastically less flame arrestor mass compared to other flame arrestor designs.

Many modifications can be made to the above-described explosion relief valve 10 without departing from the present invention. For example, while the explosion relief valve 10 is described above as being configured to attach to a crankcase of an engine, the explosion relief valve 10 can also be adapted for use on a compressor to achieve the same gas release and explosion mitigation goals. In addition, the first and second patterns of apertures 74, 76 may have different staggered angles than those described above and shown in FIGS. 8A-B and 8A-B. Furthermore, the flame arrestor 16 can also be created using more than the two metal sheets described above and either greater or fewer layers than the seven layers shown in FIGS. 6 and 7.

Figure 11:
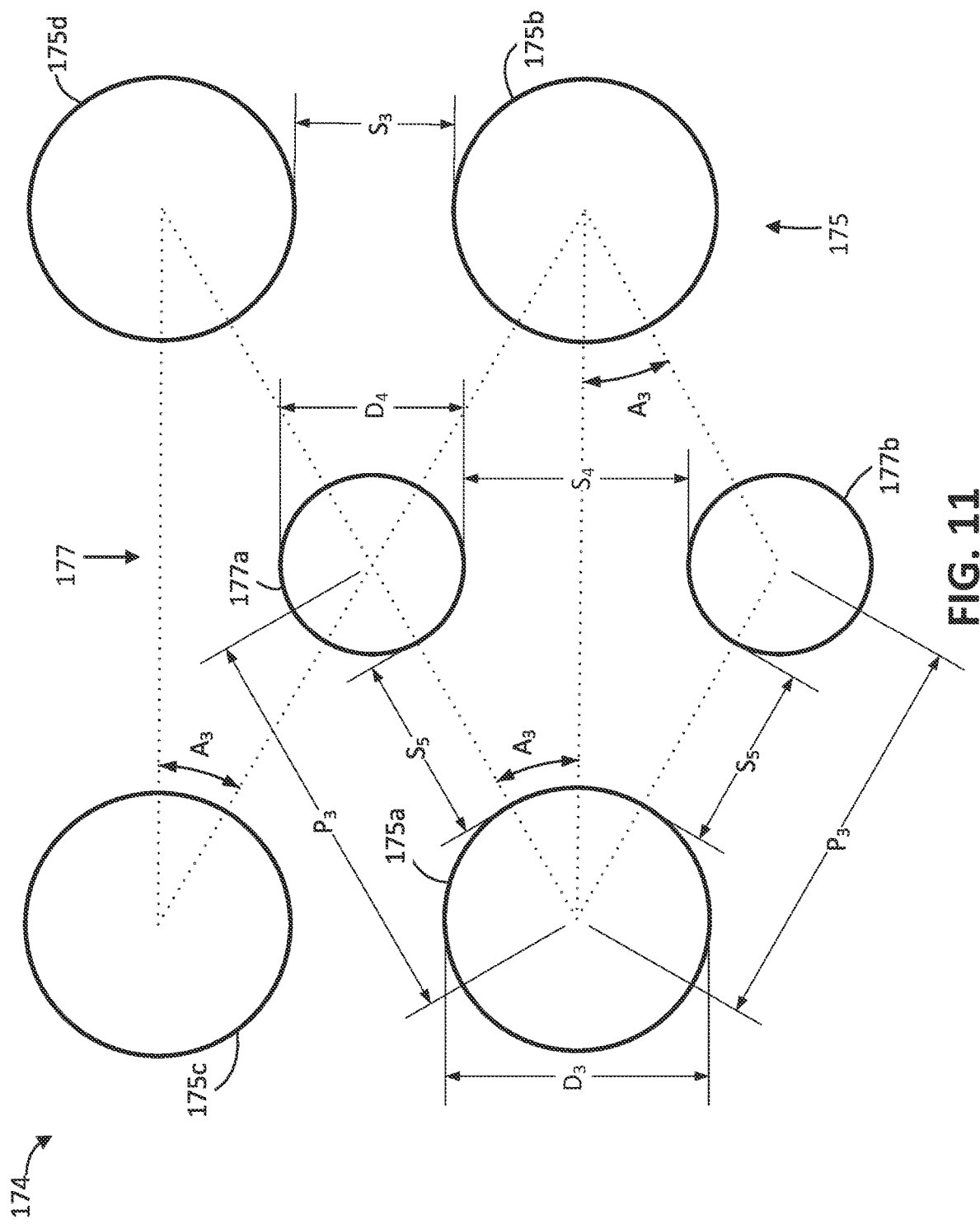
FIG. 11 is a view of an alternative pattern of apertures for a metal sheet in accordance with another embodiment of the present invention.

In addition, FIG. 11 shows an alternative pattern of apertures 174 for a metal sheet of the flame arrestor 16 having different sized and spaced apertures. In this embodiment, the alternative pattern 174 includes a first set of apertures 175 (see apertures 175a, 175b, 175c, 175d) having a third diameter $D_3$ and a second set of apertures 177 (see apertures 177a, 177b) having a fourth diameter $D_4$, wherein $D_3$ is larger than $D_4$. In addition, the vertical spacing $S_3$ between each aperture of the first set (e.g., between apertures 175a and 175c), the vertical spacing $S_4$ between each aperture of the second set (e.g., between apertures 177a and 177b) and the spacing $S_5$ between each aperture of the first set (e.g., aperture 175a) and its adjacent apertures of the second set (e.g., apertures 177a, 177b) are all different compared to each other. This pattern increases the variety of sizes and spacings between each of the apertures in the alternative pattern 174.

For example, in the embodiment shown in FIG. 11, the first set of apertures 175 have diameters of 0.063 inches and vertical spacings of 0.031 inches ($D_3$=0.063 in.; $S_3$=0.031 in.), the second set of apertures 177 have diameters of 0.033 inches and vertical spacings of 0.041 inches ($D_4$=0.033 in.; $S_4$=0.061 in.), and the spacing between each of the first set of apertures 175 and its adjacent apertures of the second set of apertures 177 is 0.046 inches ($S_5$=0.046 in.). In this embodiment, the pitch $P_3$ between two adjacent apertures is the same throughout the alternative pattern 174. However, other embodiments can incorporate differing pitches between different sets of apertures. All such modifications are intended to be within the scope of the present invention.

All examples and conditional language recited herein are intended for pedagogical purposes to aid the reader in understanding the principles of the present invention and the concepts contributed by the inventor in furthering the art. As such, they are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It is to be understood that the embodiments described herein are merely exemplary and that a person skilled in the art may make many variations and modifications without departing from the spirit and scope of the invention. All such variations and modifications are intended to be included within the scope of the invention, as defined by the following claims.

The invention claimed is:

1. An explosion relief valve for a crankcase, the valve comprising:
   a carrier plate having an outer perimeter, a lower surface, an upper surface opposite the lower surface, and an inner circumference that defines a valve inlet extending through the carrier plate from the lower surface to the upper surface;
   a cap including an outer perimeter and a lower surface;
   an annular flame arrestor extending from the upper surface of the carrier plate to the lower surface of the cap, the annular flame arrestor being coaxially aligned with the carrier plate and the cap;
   a gasket positioned against the upper surface of the carrier plate and around the valve inlet of the carrier plate; and
   a valve plate having a perimeter, a lower surface, and an upper surface opposite the lower surface, the lower surface of the valve plate being positioned against the gasket proximate to the valve inlet such that the valve plate covers the valve inlet;
   a valve spring located between the lower surface of the cap and the upper surface of the valve plate, the valve spring being compressed to bias the valve plate against the gasket;
   wherein the valve plate has a central trough portion, an outer trench portion, a medial crest portion located between the outer trench portion and the central trough portion, and an outer lip portion that engages the gasket, the central trough portion being positioned lower than the medial crest portion.

2. The explosion relief valve of claim 1, wherein the central trough portion and the outer trench portion of the valve plate are coplanar.

3. The explosion relief valve of claim 1, wherein the central trough portion is located in a plane lower than that of the outer trench portion.

4. The explosion relief valve of claim 1, wherein the flame arrestor comprises a plurality of metal sheet layers, each of the plurality of metal sheet layers having smooth first and second surfaces such that the first surface of one metal sheet layer is flush against the second surface of an adjacent metal sheet layer.

5. The explosion relief valve of claim 4, wherein the plurality of metal sheets consists of alternating layers of two different metal sheets.

6. The explosion relief valve of claim 5, wherein one metal sheet of the two different metal sheets forms the outermost layer and the innermost layer of the plurality of metal sheet layers.

7. The explosion relief valve of claim 4, wherein the plurality of metal sheets includes a first metal sheet having a first repeating pattern of apertures and a second metal sheet having a second repeating pattern of apertures.

8. The explosion relief valve of claim 7, wherein the first metal sheet and the second metal sheet abut each other and form a coil shape with a plurality of revolutions corresponding to the plurality of metal sheet layers.

9. The explosion relief valve of claim 8, wherein the first repeating pattern of apertures includes at least one aperture having a first diameter, and the second repeating pattern of apertures includes at least one aperture having a second diameter, wherein the first diameter is smaller than the second diameter.

10. The explosion relief valve of claim 9, wherein the first metal sheet forms an outermost layer and an innermost layer of the plurality of metal sheet layers of the flame arrestor.

11. The explosion relief valve of claim 7, wherein each aperture of the first and second repeating patterns of apertures has a circumference, each aperture of the first repeating pattern of apertures is spaced away from adjacent apertures from circumference to circumference by a first spacing, and each aperture of the second repeating pattern of apertures is spaced away from adjacent apertures from circumference to circumference by a second spacing, the first spacing being larger than the second spacing.

12. The explosion relief valve of claim 1, wherein the lower surface of the valve plate is convex in the central trough portion.

13. The explosion relief valve of claim 1, wherein the valve plate is formed from a single rigid part.

14. An explosion relief valve for a crankcase, the valve comprising:
   a carrier plate having an outer perimeter, a lower surface, an upper surface opposite the lower surface, and an inner circumference that defines a valve inlet extending through the carrier plate from the lower surface to the upper surface;
   a cap including an outer perimeter and a lower surface;
   an annular flame arrestor extending from the upper surface of the carrier plate to the lower surface of the cap, the annular flame arrestor being coaxially aligned with the carrier plate and the cap;
   a gasket positioned against the upper surface of the carrier plate and around the valve inlet of the carrier plate; and
   a valve plate having a perimeter, a lower surface, and an upper surface opposite the lower surface, the lower surface of the valve plate being positioned against the gasket proximate to the valve inlet such that the valve plate covers the valve inlet;
   a valve spring that is positioned and adapted to bias the valve plate against the gasket;
   wherein the valve plate has a central trough portion, an outer lip portion, and an outer trench portion located between the central trough portion and the outer lip portion, the outer lip portion engaging the gasket, wherein no other portion of the valve plate extends lower than the central trough portion.

15. The explosion relief valve of claim 14, wherein the central trough portion is coplanar with the outer trench portion.

16. The explosion relief valve of claim 14, wherein the valve plate further comprises a medial crest located between the outer trench portion and the central portion.

17. The explosion relief valve of claim 16, wherein the central trough portion is located lower than the medial crest portion.

18. The explosion relief valve of claim 14, wherein the lower surface of the valve plate is convex in the central trough portion.

19. The explosion relief valve of claim 14, wherein the valve plate is formed from a single rigid part.

20. An explosion relief valve for a crankcase, the valve comprising:

a carrier plate having an outer perimeter, a lower surface, an upper surface opposite the lower surface, and an inner circumference that defines a valve inlet extending through the carrier plate from the lower surface to the upper surface;

a cap including an outer perimeter and a lower surface;

an annular flame arrestor extending from the upper surface of the carrier plate to the lower surface of the cap, the annular flame arrestor being coaxially aligned with the carrier plate and the cap;

a gasket positioned against the upper surface of the carrier plate and around the valve inlet of the carrier plate; and a valve plate having a perimeter, a lower surface, and an upper surface opposite the lower surface, the lower surface of the valve plate being positioned against the gasket proximate to the valve inlet such that the valve plate covers the valve inlet;

a valve spring that is positioned and adapted to bias the valve plate against the gasket;

wherein the valve plate has a central trough portion, an outer lip portion, and an outer trench portion located between the central trough portion and the outer lip portion, the outer lip portion engaging the gasket, wherein the lower surface of the valve plate is convex in the central trough portion.

* * * * *